United States Patent
Avdesh Khanna (10) Patent No.: US 10,880,194 B2
(45) Date of Patent: Dec. 29, 2020

(54) METHOD AND SYSTEM FOR PERFORMING INTELLIGENT ORCHESTRATION WITHIN A HYBRID CLOUD

(71) Applicant: WIPRO LIMITED, Bangalore (IN)

(72) Inventor: Vijay Avdesh Khanna, Bangalore (IN)

(73) Assignee: Wipro Limited, Bangalore (IN)

( * ) Notice: Subject to any disclaimer, the term of this patent is extended or adjusted under 35 U.S.C. 154(b) by 249 days.

(21) Appl. No.: 15/940,501

(22) Filed: Mar. 29, 2018

(65) Prior Publication Data
US 2019/0306045 A1 Oct. 3, 2019

(30) Foreign Application Priority Data
Mar. 29, 2018 (IN) .............................. 201841011818

(51) Int. Cl.
*H04L 12/26* (2006.01)
*H04L 12/24* (2006.01)
(Continued)

(52) U.S. Cl.
CPC ........ *H04L 43/0876* (2013.01); *G06F 9/5072* (2013.01); *G06F 11/008* (2013.01);
(Continued)

(58) Field of Classification Search
CPC ............. H04L 43/0876; H04L 41/0686; H04L 41/5009; H04L 41/5019; H04L 67/10;
(Continued)

(56) References Cited

U.S. PATENT DOCUMENTS 8,447,851 B1 * 5/2013 Anderson ........... G06F 11/3006
709/223
10,069,935 B1 * 9/2018 Coleman ............ H04B 7/18504
(Continued)

FOREIGN PATENT DOCUMENTS

| EP | 3032417 A1 | 6/2016 |
| JP | 2015-132950 | 7/2015 |
| WO | 2014021849 A1 | 2/2014 |

OTHER PUBLICATIONS

Coote, S., "Cloud Orchestration without Boundaries", *IBM*, (2014), pp. 1-30.
(Continued)

*Primary Examiner* — Todd L Barker
(74) *Attorney, Agent, or Firm* — Finnegan, Henderson, Farabow, Garrett & Dunner, LLP (57) ABSTRACT

This disclosure relates generally to orchestration, and more particularly to method and system for performing intelligent orchestration within a hybrid cloud environment. In one embodiment, a method of performing intelligent orchestration within a hybrid cloud environment including a plurality of end-point computing devices is disclosed. The method may include monitoring a capacity and an availability of each of the plurality of end-point computing devices, predicting an ability to successfully execute a requested orchestration workflow along with a confidence score, based on the capacity and the availability, by querying an intelligent database that includes historical execution data of past orchestration workflows, and effecting an execution of the requested orchestration workflow based on the ability and the confidence score.

11 Claims, 5 Drawing Sheets

(51) Int. Cl.
*H04L 29/08* (2006.01)
*G06F 9/50* (2006.01)
*G06F 11/00* (2006.01)

(52) U.S. Cl.
CPC ...... *H04L 41/0686* (2013.01); *H04L 41/5009* (2013.01); *H04L 41/5019* (2013.01); *H04L 67/10* (2013.01)

(58) Field of Classification Search
CPC ..... H04L 67/14; H04L 67/327; G06F 9/5072; G06F 11/008
See application file for complete search history.

(56) References Cited

U.S. PATENT DOCUMENTS

| | | | | |
|---|---|---|---|---|
| 10,129,078 | B2* | 11/2018 | Kumar | ............ G06F 8/30 |
| 2015/0120936 | A1 | 4/2015 | Palan et al. | |
| 2016/0266962 | A1 | 9/2016 | Rajasekharan et al. | |
| 2017/0063599 | A1 | 3/2017 | Wu et al. | |
| 2018/0285146 | A1* | 10/2018 | Valecha | ............ G06F 9/5072 |
| 2019/0041830 | A1* | 2/2019 | Yarvis | ............ H04L 67/10 |

OTHER PUBLICATIONS

Levy, J., "Azure Automation in Depth Runbook Authoring", Blog, https://azure.microsoft.com/en-in/blog/azure-automation-in-depth-runbook-authoring/, (2014), pp. 1-19.
Sanders, C., "Azure Automation: Controlling runbook Streams for Testing and Troubleshooting", Blog, http://azure.microsoft.com/en-in/blog/azure-automation-controlling-runbook-streams-for-testing-and-troubleshooting/, (2014), pp. 1-12.
Shalom, N., "Cloud orchestration and real-time analytics to avoid downtime", *Embedded Computer Design*, (2014), pp. 1-9.
"Runbook output and messages in Azure Automation", Blog, https://docs.microsoft.com/en-us/azure/automation-runbook-output-and-messages, (2018), pp. 1-17.
Extended European Search Report issued in the European Patent Office in counterpart European Application No. 18180760.3, dated Dec. 21, 2018. 8 pages.

* cited by examiner

METHOD AND SYSTEM FOR PERFORMING INTELLIGENT ORCHESTRATION WITHIN A HYBRID CLOUD

TECHNICAL FIELD

This disclosure relates generally to orchestration, and more particularly to method and system for performing intelligent orchestration within a hybrid cloud environment.

BACKGROUND

Orchestration is a well-known technique in cloud computing and may relate to managing interconnections and interactions among workloads on public and private cloud infrastructure. Some of the commonly known orchestrators include HPE™ Operations Orchestrator, BMC™ Atrium Orchestrator, and VMware™ vRealize Orchestrator. For performing orchestration in a traditional data center environment, the orchestrators may execute run-book-workflows (that is, orchestration workflows) across various data center elements. The orchestration workflows may trigger various tasks, such as commands, scripts, simple object access protocol (SOAP) application programming interface (API), and representational state transfer (REST) API on a number of end-point computing devices via various tools, such as Internet protocol address management (IPAM), active directory (AD), hypervisor, domain name server (DNS), firewalls, switches, backup server, monitoring server, storage, configuration management database (CMDB), information technology service management (ITSM), software defined solutions, and public clouds. Further, the workflows may work in tandem with various portal solutions, such as VMware™ vRealize automation, BMC™ cloud lifecycle management, HPE™ cloud service automation, so as to provide user-friendly front end portals. As will be appreciated, these portals may execute orchestration workflows by allowing custom forms, user input validation and integration, and so forth.

Orchestration in private cloud may define policies and service levels by way of various processes, such as automated workflows, provisioning, and change management. Orchestration may be advantageous in a number of ways. For example, Orchestration may provide for creating an application-aligned infrastructure, and may further allow for scaling-up or scaling-down of the same depending on the needs of each application. Orchestration may further provide a centralized management of various resources, such as billing, metering, chargeback for consumption, and so forth. Orchestration may further help reduce time and effort for deploying multiple instances of a single application. Orchestration may be performed using orchestration workflows which define a logical flow of activities or tasks from a start event to an end event to accomplish a specific service. The Orchestration workflows may be executed in a data center environment, and may be used to automate run book automations or performing orchestration.

However, during performing orchestration, orchestration workflows may typically encounter issues that may cause them to fail intermittently. One of the primary reasons leading to failure of orchestration workflow may include insufficient capacity (for example, no or low infrastructure capacity in terms of storage, processing, licenses, etc.) of the end-point computing devices implementing the orchestration. In other words, the end-point computing device may have insufficient capacity as cloud, hypervisor, backup, storage, IPs in VLAN or IPAM, and so forth. Additionally, in some scenarios, end-point computing device may be heavily loaded due to computationally intensive processing related to business operations, thereby resulting in failure of orchestration workflow. Further, in certain scenarios, a recent implementation of network/security rules may result in disruption in network communication between orchestrator and the end-point computing devices, which in turn may result in failure of orchestration workflow. Moreover, scheduled maintenance activities on datacenter Infrastructure may lead to failure of orchestration workflow. Other factors that may lead to failure of orchestration workflow may include, but may not be limited to, change in administrator password, expiry of keys, change in tokens, or the like. To restore the orchestration, the orchestrator may require to re-execute orchestration workflows (that is, roll-back all prior steps) after resolving the issues. As will be appreciated, the failure of the orchestration workflows at different stages and subsequent restoration of the same may result in loss of time for end users, operators or administrators, and wastage of computational power, consumed during re-execution of the orchestration workflows, for various resources.

Thus, existing orchestration techniques and run-book automation tools in the traditional data center environment lack the capability of self-recovery, awareness of environment capacity and availability, and self-restoration of the orchestration workflows upon failure. For example, the existing orchestration techniques and run-book automation tools lack the capability of monitoring the environment monitoring and providing a proactive forecast to the user about the ability to successfully execute the orchestration workflows.

SUMMARY

In one embodiment, a method for performing intelligent orchestration within a hybrid cloud environment including a plurality of end-point computing devices is disclosed. In one example the method may include monitoring a capacity and an availability of each of the plurality of end-point computing devices. The method may further include predicting an ability to successfully execute a requested orchestration workflow along with a confidence score, based on the capacity and the availability, by querying an intelligent database that includes historical execution data of past orchestration workflows. The method further may include effecting an execution of the requested orchestration workflow based on the ability and the confidence score.

In one embodiment, a system for performing intelligent orchestration within a hybrid cloud environment including a plurality of end-point computing devices is disclosed. In one example, the system may include an orchestration device including at least one processor and a computer-readable medium coupled to the processor. The computer-readable medium may store processor-executable instructions, which, on execution, may cause the processor to monitor a capacity and an availability of each of the plurality of end-point computing devices. The processor-executable instructions, on execution, may further cause the processor to predict an ability to successfully execute a requested orchestration workflow along with a confidence score, based on the capacity and the availability, by querying an intelligent database that includes historical execution data of past orchestration workflows. The processor-executable instructions, on execution, may further cause the processor to effect an execution of the requested orchestration workflow based on the ability and the confidence score.

In one embodiment, a non-transitory computer-readable medium storing computer-executable instructions for performing intelligent orchestration within a hybrid cloud environment including a plurality of end-point computing devices. In one example, the stored instructions, when executed by a processor, may cause the processor to monitor a capacity and an availability of each of the plurality of end-point computing devices. The stored instructions, when executed by the processor, may further cause the processor to predict an ability to successfully execute a requested orchestration workflow along with a confidence score, based on the capacity and the availability, by querying an intelligent database that includes historical execution data of past orchestration workflows. The stored instructions, when executed by the processor, may further cause the processor to effect an execution of the requested orchestration workflow based on the ability and the confidence score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
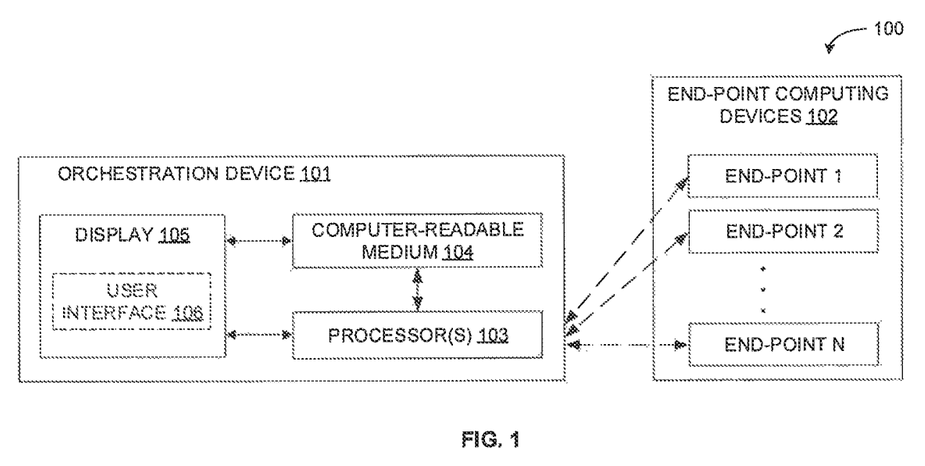
FIG. 1 is a block diagram of an exemplary system for performing intelligent orchestration within a hybrid cloud environment, in accordance with some embodiments of the present disclosure.

Referring now to FIG. 1, an exemplary system 100 for performing intelligent orchestration within a hybrid cloud environment is illustrated in accordance with some embodiments of the present disclosure. In particular, the system 100 may include an orchestration device 101 and a number of end-point computing devices 102 (End-point 1, End-point 2 . . . End-point N), which may form the hybrid cloud environment. As will be appreciated, the hybrid cloud environment, also referred to as hybrid cloud platform, may include a public cloud (for example, Amazon™ web service, Microsoft™ Azure, Google™ cloud platform, or the like) and a private cloud (for example, legacy data center infrastructure and software defined cloud infrastructure). By way of an example, the end-point computing devices 102 may include private clouds built using tools, such as VMware™ vRealize automation, BMC™ cloud lifecycle management, HPE™ cloud service automation, and so forth. The orchestration device 101 may be used for deployment of new operating system (OS) via self-service portals, and for auto-configuration of on-premise data center tools, such as DNS, IPAM, Backup, Storage, Hypervisor, ITSM tools like SNOW or Remedy, configuration management software like Puppet or Chef, patch management software, or the like.

It should be noted that the orchestration device 101 and the end-point computing devices 102 may be in communication among each other directly or through an intermediary device(s). As will be appreciated by those skilled in the art, the orchestration device 101 and each of the end-point computing devices 102 may be processor based computing devices capable of being part of the hybrid cloud environment. The processor based computing device may include, but is not limited to, a computer, a laptop, a personal computing device (e.g., a tablet computer, a smartphone, etc.), a server, a router, a network switch, a storage device, and so forth. By way of an example, the orchestration device 101 may be employed by SDX (for example, a family of development environments for systems engineers and software engineers) so as to enable developers, with little or no knowledge about field-programmable gate array (FPGA), to use high level programming languages for leveraging the power of programmable hardware with industry standard processors. Further, the orchestration device may allow converting non-SDN/X legacy environment to more intelligent environment almost at par to SDN/SDX.

The orchestration device 101 may implement an intelligent orchestration engine for performing intelligent orchestration within the hybrid cloud environment that may include a number of end-point computing devices 102, in accordance with some embodiments of the present disclosure. As will be described in greater detail in conjunction with FIGS. 2-6, the intelligent orchestration engine may monitor a capacity and an availability of each of the end-point computing devices, predict an ability to successfully execute a requested orchestration workflow along with a confidence score, based on the capacity and the availability, by querying an intelligent database that includes historical execution data of past orchestration workflows, and effect an execution of the requested orchestration workflow based on the ability and the confidence score. As stated above, the orchestration device 101 may perform orchestration on the end-point computing devices 102 through one or more of existing tools, such as virtual machine (for example, VMware™ vCenter), cloud console (for example, AWS console), backup Server, IPAM server, monitoring Server, or the like.

The orchestration device 101 may include one or more processors, such as one or more processor, such as processor(s) 103, a computer readable medium (e.g., a memory) 104, and a display 105. The computer-readable medium 104 may store instructions that, when executed by the one or more processors 103, cause the one or more processors 102 to perform intelligent orchestration within the hybrid cloud environment in accordance with aspects of the present disclosure. The computer-readable storage medium 104 may also store various data (e.g., capacity or availability of each of the end-point computing devices, requested orchestration workflows, ability to successfully execute requested orchestration workflows along with their confidence scores, historical execution data, service level agreement (SLA), machine learning model, query data, historical troubleshooting data, historical network performance data, historical performance data of end-point computing devices, scheduled maintenance data of end-point computing devices, dynamic performance data of end-point computing devices, feedbacks to the users, etc.) that may be obtained, analyzed, generated, or required by the orchestration device 101 or by the system 100. The one or more processors 103 may perform data processing functions so as to monitor the capacity and the availability of each of the plurality of end-point computing devices, predicting the ability to successfully execute a requested orchestration workflow, effect the execution of the requested orchestration workflow, build a machine learning model, store data with respect to the execution of the requested orchestration workflow in the intelligent database, provide a feedback to the user, and so forth. The orchestration device 101 may interact with a user (for example, network administrator, system administrator, IT analyst, etc.) via a user interface 106 accessible via the display 105.

As will be appreciated, in some embodiments, the orchestration device 101 may be located locally with respect to the end-point computing devices 102. Further, as will be appreciated, in some embodiments, the orchestration device 101 may be located remotely with respect to the end-point computing devices 102. For example, in some embodiments, the orchestration device 101 may be located in a remote server of a service provider. Further, as will be appreciated, in some embodiments, various components of the orchestration device 101 may be physically located together in one device. Alternatively, in some embodiments, the components of the orchestration device 101 may be physically distributed across various devices. For example, the processor 103 and the computer readable medium 104 may be physically located together in one device or may be physically distributed across various devices.

Figure 2:
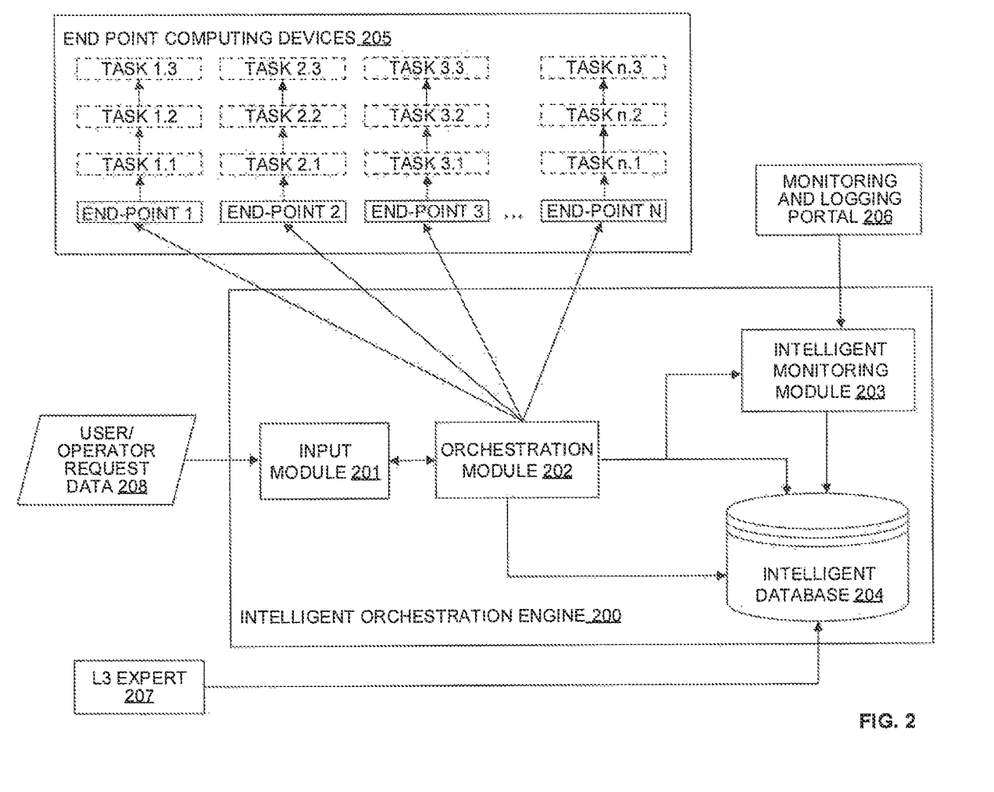
FIG. 2 is a functional block diagram of an intelligent orchestration engine in accordance with some embodiments of the present disclosure.

Referring now to FIG. 2, a functional block diagram of an intelligent orchestration engine 200, implemented by the orchestration device 101 of the system 100 of FIG. 1, is illustrated in accordance with some embodiments of the present disclosure. The intelligent orchestration engine 200 is an artificial intelligence (AI) based orchestration engine and may include various modules that perform various functions so as to perform intelligent orchestration within the hybrid cloud environment. In some embodiments, the intelligent orchestration engine 200 may include an input module 201, an orchestration module 202, an intelligent monitoring module 203, and an intelligent database 204. As will be appreciated by those skilled in the art, all such aforementioned modules 201-203 may be represented as a single module or a combination of different modules. Moreover, as will be appreciated by those skilled in the art, each of the modules 201-203 and the intelligent database 204 may reside, in whole or in parts, on one device or multiple devices in communication with each other. For example, each of the modules 201-203 and the intelligent database 204 may reside, in whole or in parts, on any of the orchestration device 101 and/or the end-point computing devices 205 (analogous to the end-point computing devices 102 of FIG. 1). The intelligent orchestration engine 200 may further communicate with a monitoring and logging portal 206 and a level 3 (L3) expert 207.

The input module 201 may receive a request from a user for performing orchestration within the hybrid cloud environment, which may include a number of end-point computing devices 205. The input module 201 may include a user interface for facilitating interaction with the user. As may be appreciated by those skilled in the art, the input module 201 may require the user to enter the request for performing orchestration, via the user interface 106. By way of an example, the input module 201 may prompt the user to either select variables from a set of options, or may prompt the user to manually enter details regarding the orchestration flow. Based on the request from the user, the input module may trigger an orchestration workflow in the orchestration module 202.

The orchestration module 202 may receive the trigger for orchestration workflow from the input module 201 for performing orchestration in the plurality of end-point computing devices 205. By way of an example, the trigger may be in form of remote API specifications that may include routines, data structures, object classes, variables or remote calls. For example, the triggers may be in form of SOAP/REST API calls or remote SSH trigger calls. Based on the trigger received, the orchestration module 202 may further effect orchestration workflow in the end-point computing devices 205. The orchestration module 202 may affect the orchestration workflows in the end-point computing devices 205 via one or more of tools, such as backup solution, IPAM, ITSM, puppet, AD, VCenter, AWS, or the like. Upon receiving the trigger from the orchestration module 202, each of the plurality of end-point computing devices 205 may execute various orchestration tasks (Task 1.1, Task 1.2, Task1.3, Task 2.1 . . . Task n.3). The tasks may include creation of virtual machine, snapshot, power off machine, FTP log files, creating incident in ITSM portals, firing backups, checking status of infrastructure as network availability, VCenter availability, and so on.

Before triggering the orchestration workflow, the orchestrator module 202 may query the intelligent database 204 in order to predict an ability of the end-point computing devices 205 to successfully execute the requested orchestration workflow. Based on querying the intelligent database 204, the orchestrator engine 202 may further predict a confidence score of successfully executing the orchestration workflows based on the capacity and the availability of the plurality of end-point computing devices 205.

The intelligent monitoring module 203 may communicate with the end-point computing devices 205 to monitor the plurality of end-point computing devices 205. The intelligent monitoring module 203 may monitor the capacity and the availability of each of the end-point computing devices 205 for performing orchestration. The intelligent monitoring module 203 may further predict an ability to successfully perform orchestration on each of the end-point computing devices 205 so as to execute a requested orchestration workflow along with a confidence score based on the capacity and the availability. Based on monitoring, the intelligent monitoring module 203 may update the capacity and an availability of the plurality of end-point computing devices 205 on the intelligent database 204.

The monitoring and logging portal 206 may be communicatively coupled to intelligent monitoring module 203. The monitoring and logging portal 206 may access the intelligent monitoring module 203 to obtain the capacity and the availability of the plurality of end-point computing devices 205. Additionally, based on the capacity and the availability of the plurality of end-point computing devices 205, the monitoring and logging portal 206 may provide a feedback to the user about whether the orchestration workflow would be successfully executed or not.

The intelligent database 204 is a data repository that may be queried by the intelligent monitoring module 203 for performing orchestration on the plurality of end-point computing devices 205 within the hybrid cloud environment. The intelligent database 204 may be communicatively coupled with intelligent monitoring module 203 from which it may receive various type of data associated with a historical or a current orchestration performed on the end-point computing devices. The intelligent database 204 may store data which may include historical troubleshooting data to resolve failure of past orchestration workflows, historical network performance data of the hybrid cloud environment, historical performance data of the end-point computing devices, scheduled maintenance data of the end-point computing devices, or dynamic performance data of the end-point computing devices. The intelligent database 204 may further include historical data of downtimes on network segments and servers, and historical data of failures of orchestration flows. The intelligent database 204 may receive and store historical data of flow executions that may include flow time for each flow and sub-flow, typical errors encountered with each flow or sub-flow, typical issues encountered with different combinations of various flow aspects. By way of an example, the creating a demilitarized zone (DMZ) based Operating System (OS) with a combination of one storage type and one specific firewall rules may be reported to fail 50% of times. The intelligent database 204 may further store data about various parameters associated with the failures, such as time of day at which failure happened or was reported. The intelligent database 204 may further store data about scheduled maintenance of the end-point computing devices 205, and data about the availability and unavailability of the end-point computing devices 205. The intelligent database 204 may receive current status of the end-point computing devices 205 from the intelligent monitoring module 203 which may continuously monitor the end-point computing devices 205 for available capacity, login access, maintenance schedule, or the like. The intelligent database 204 may further store real-time data of the information technology (IT) elements, such as current capacity and availability of the IT elements. It may be noted that orchestration workflows may fail intermittently due to one or more issues, and may require re-execution after solving the one or more issues. The workflows may be made to store the flow execution state and all parameters at that time, along with the Level 1 (L1) or Level 2 (L2) troubleshooting with various paths taken. The Information about the workflow failures, the frequency of the failures, the parameters associated with the failures, and the steps taken to resolve the failures may be stored in the intelligent database 204.

The intelligent database 204 may further store historical data about trouble-shooting performed at various levels, such as L1, L2 and L3 upon reporting of failure, so as to resume the orchestration flows and ensure successful completion of the orchestration flows. The L3 expert module may be communicatively coupled to the intelligent database 204, and may provide historical data about trouble-shooting at various levels. The L3 expert module 207 may update the intelligent database 204 with data about known issues affecting the successful execution of orchestration workflow, and possible solutions that may be performed on a regular basis. As will be appreciated by those skilled in the art, upon encountering a failure in successfully executing the orchestration flows, the trouble-shooting may be conducted at different levels (such as L1, L2 and L3) with an attempt to resume the orchestration flows and ensure successful execution. The L3 expert module may record information about such trouble-shooting. The information about troubleshooting recorded by the L3 expert module may be stored by the intelligent database 204. The intelligent database 204 may analyze the information about trouble-shooting. Based on the analysis, the intelligent database 204 may employ artificial intelligence to create automated intelligent workarounds in the orchestration workflows so as to resolve the issues leading to the failure of the execution of the orchestration workflows. By way of an example, the intelligent database 204 may build a machine learning model to analyze the data stored by the intelligent database 204, and to respond to a query made by the orchestration module 202. In other words, the intelligent database 204 may be a machine learning database model, which may be fed by the orchestration workflows.

It may be noted that the orchestration module 202 may access the various types of data stored by the intelligent database 204 and intelligent workarounds created by the intelligent database 204. Upon encountering a failure in the orchestration workflow execution, the orchestration module 202 may analyze the data and the intelligent workarounds and attempt to perform troubleshooting. By way of an example, based on the data analyzed, the orchestration module may execute orchestration workflows in different combinations to resume the orchestration workflow execution. The orchestration module 202 may further schedule maintenance activity of the plurality of end-point computing devices 205. Based on the data analyzed, the orchestration module 202 may predict an ability of the end-point computing devices 205 to successfully execute a requested orchestration workflow. The orchestration module 202 may further predict a confidence score based on the capacity and the availability of the end-point computing devices 205 on the basis of the analyzed data.

By way of an example, when a failure to execute the orchestration workflows is encountered in any of the end-point computing devices 205, the intelligent orchestration engine 200 may analyze the historical execution data of past orchestration workflows stored in the intelligent database 204. Based on the historical execution data of past orchestration workflows, the intelligent orchestration engine 200 may determine historical trends of the success and failure of the execution data of the orchestration workflows during that day or time of the year. Based on the trends of the success and failure of the execution data, the intelligent orchestration engine 200 may provide a feedback to the user of the expected chance of success or failure of the execution of the orchestration workflows. As may be appreciated by those skilled in the art, the execution of the orchestration workflows may fail due to one or more reasons during a particular day or time of a month or a year. Further, the intelligent orchestration engine 200 may receive maintenance schedules that may be updated by the users (for example, administrators). The maintenance schedules may indicate the time periods and time durations (in a specific month or year) for which the plurality of end-point computing devices 205 may not be available. Further, the intelligent orchestration engine 200 may proactively monitor the end-point computing devices 205 for their performance, availability and capacity computing.

It should be noted that the intelligent orchestration engine 200 may be implemented in programmable hardware devices such as programmable gate arrays, programmable array logic, programmable logic devices, and so forth.

Alternatively, the intelligent orchestration engine 200 may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code could be a single instruction, or many instructions, and may even be distributed over several different code segments, among different applications, and across several memory devices.

Figure 3:
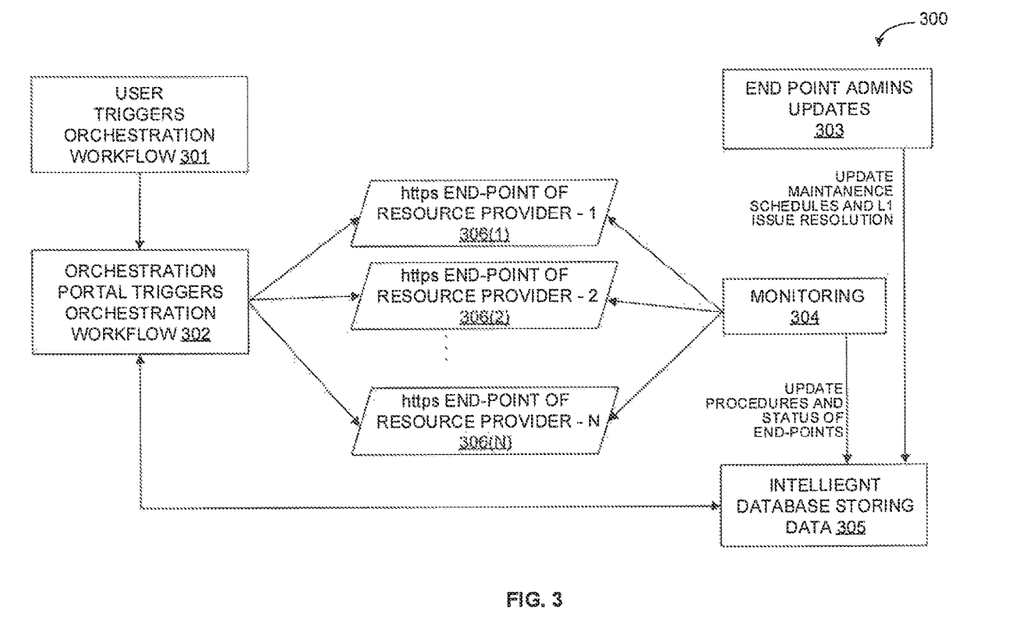
FIG. 3 is a flow diagram of an exemplary process overview for performing intelligent orchestration within a hybrid cloud environment, in accordance with some embodiments of the present disclosure.

Referring now to FIG. 3, an overview of an exemplary process 300 for performing intelligent orchestration within a hybrid cloud environment is depicted via a flowchart, in accordance with some embodiments of the present disclosure. At step 301, a user may trigger an orchestration workflow in an orchestration portal, also known as a cloud portal. As may be appreciated by those skilled in the art, the orchestration portal may implemented by the orchestration module 202 of the orchestration device and rendered to the user by the input module 201 of the orchestration device. In some embodiments, the user may interact with the orchestration portal, and submit request on the orchestration portal to trigger the execution of the orchestration workflow. By way of an example, to trigger the orchestration workflow in the orchestration portal, the user may manually enter details for the orchestration workflow, or the user may select certain variables from a set of options.

At step 302, the orchestration portal may effect execution of the orchestration workflow in the plurality of end-point computing devices 205. However, before effecting the execution of the orchestration workflow in the plurality of end-point computing devices 205, the orchestration portal may first query an intelligent database 204 about a capacity and an availability of each of the plurality of end-point computing devices 205 for performing orchestration.

Thus, the intelligent database 204, which may store historical execution data of past orchestration workflows, may be queried by the orchestration portal. As mentioned earlier, the intelligent database 204 may be a data repository that may store various types of data, such as historical execution data of past orchestration workflows, historical troubleshooting data to resolve failure of past orchestration workflows, historical network performance data of the hybrid cloud environment, historical performance data of the plurality of end-point computing devices, scheduled maintenance data of the plurality of end-point computing devices, and dynamic performance data of the plurality of end-point computing devices. Further, the intelligent database 204 may receive and store monitoring data about the capacity and the availability of each of the plurality of end-point computing devices from an intelligent monitoring module 203 which may continuously monitor the plurality of end-point computing devices 205 for their available capacity, login access, maintenance schedule, and so forth.

Independently, at step 303, end-point administrators and L3 experts may provide maintenance schedule data and historical troubleshooting data to the intelligent database 204. The historical troubleshooting data may include data about troubleshooting performed at various levels, such as L1, L2 and L3 upon reporting of failure in executing orchestration workflow. Thereafter, the process proceeds to step 305. At step 305, the maintenance schedule data and historical troubleshooting data may be updated in the intelligent database 204.

Further, concurrently, at step 304, the plurality of end-point computing devices 205 may be monitored for their capacity and availability. Thus, a capacity and an availability of each of the plurality of end-point computing devices 205 may be monitored for performing orchestration. Further, at step 304, the intelligent monitoring module 203 may examine for access clearance to tokens given to the orchestration device. It may be noted that the intelligent monitoring module 203 may monitor periodic variations in the capacity and the availability at different times of each of the plurality of end-point computing devices 205 for performing orchestration. Based on periodic variations, the intelligent monitoring module 203 may determine chances of failure at different times in a day. For example, chances of failure in the day may be higher, as there may be heavier business load during the day as compared to night.

Thereafter, at step 305, the capacity and the availability of each of the plurality of end-point computing devices may be updated on the intelligent database 204. Based on monitoring, the intelligent monitoring module 203 may update the status (about the capacity and the availability) of the plurality of end-point computing devices 205 on the intelligent database 204. As stated above, at step 302, the orchestrator module 202 may query the intelligent database 204 about the capacity and the availability of each of the plurality of end-point computing devices 205. Upon querying the intelligent database 204 which includes historical execution data of past orchestration workflows, the orchestrator module 202 may predict an ability to successfully execute a requested orchestration workflow along with a confidence score, based on the capacity and the availability of the each of the plurality of end-point computing devices 205. In other words, at step 302, the orchestration module 202 may predict an ability to successfully execute a requested orchestration workflow by querying the intelligent database 204. Further, the orchestration module 202 may determine a confidence score signifying a possibility of completing an orchestration workflow, if executed, based upon the querying of the intelligent database 204.

At step 306, based on the ability and the confidence score, the orchestration workflow may be executed on the plurality of end-point computing devices 205. As it may be appreciated by those skilled in the art, if the predicted ability and the confidence score indicates a relatively high possibility of completing an execution of the requested orchestration workflow, the execution of the orchestration workflow may be effected. However, if the predicted ability and the confidence score indicates a relatively low possibility of completing the execution of the orchestration workflow, then the user may be apprised about it. By way of an example, the user may be presented on a display screen the various possible outcomes of executing the orchestration workflow and the estimated time of completion of the workflow execution based on the predicted ability and the confidence score. Further, the user may be presented other information, such as current availability and capacity of the plurality of end-point computing devices 205, such as end-point computing device (1) to (N) serviced by end-point resource provider-1 306(1) to N 306(N), respectively, and the various tools implementing the plurality of end-point computing devices 205, such as IPAM, DNS, Hypervisor, Backup, Storage etc. Further, the user may be presented recent trends of workflow execution (for example, percentage success rate of workflow execution) over a week, month of year. Further, if one or more IT components required in the workflow execution is not available due to experiencing downtime, volatility, or capacity-constraints, the user may be provided suggestions for alternate configurations for the unavailable IT elements. Further, the user may be suggested specific changes to ensure success in the execution of the requested workflow. Further, the user may be given a weekly report of availability of the end-point computing devices 205, and recommendations for ideal configuration. Further, the user may be provided the estimated time for executing the workflow, and suggestions for most-likely-to-succeed parameters (for example, suggestion for using SATA disk instead of SSD due to capacity constraints).

As will be appreciated by one skilled in the art, a variety of processes may be employed for performing intelligent orchestration within a computing hybrid cloud environment. For example, the exemplary system 100 and the associated intelligent orchestration engine 200 may perform intelligent orchestration within the hybrid cloud environment by the processes discussed herein. In particular, as will be appreciated by those of ordinary skill in the art, control logic and/or automated routines for performing the techniques and steps described herein may be implemented by the system 100 and the associated intelligent orchestration engine 200, either by hardware, software, or combinations of hardware and software. For example, suitable code may be accessed and executed by the one or more processors on the system 100 to perform some or all of the techniques described herein. Similarly application specific integrated circuits (ASICs) configured to perform some or all of the processes described herein may be included in the one or more processors on the system 100.

Figure 4:
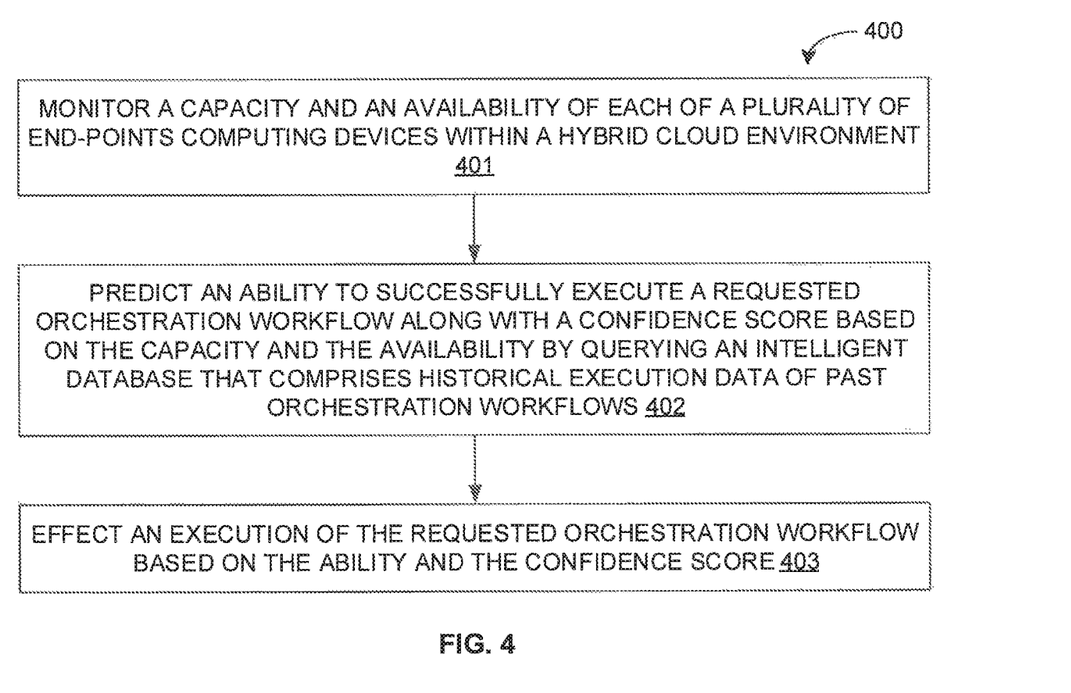
FIG. 4 is a flow diagram of a detailed exemplary process for performing intelligent orchestration within a hybrid cloud environment, in accordance with some embodiments of the present disclosure.

Referring now to FIG. 4, an exemplary control logic 400 for performing intelligent orchestration within a hybrid cloud environment via a system, such as system 100, is depicted via a flowchart in accordance with some embodiments of the present disclosure. As illustrated in the flowchart, the control logic 400 may include the steps of monitoring a capacity and an availability of each of the plurality of end-point computing devices at step 401, predicting an ability to successfully execute a requested orchestration workflow along with a confidence score, based on the capacity and the availability, by querying an intelligent database that comprises historical execution data of past orchestration workflows at step 402, and effecting an execution of the requested orchestration workflow based on the ability and the confidence score at step 403.

In some embodiments, the control logic 400 may further include the step of building a machine learning model to analyze the intelligent database, and to respond to a query by the orchestration device. Additionally, in some embodiments, the control logic 400 may further include the step of storing data with respect to the execution of the requested orchestration workflow in the intelligent database. Moreover, in some embodiments, the control logic 400 may further include the step of providing a feedback to the user based on the ability and the confidence score. It should be noted that, in some embodiments, the feedback may include a notification of a probable failure in execution of the requested workflow or in execution of the requested workflow as per a service level agreement.

In some embodiments, predicting at step 402 may include predicting the ability to successfully execute the requested orchestration workflow as per a service level agreement. Additionally, in some embodiments, the intelligent database may further include at least one of historical troubleshooting data to resolve failure of past orchestration workflows, historical network performance data of the hybrid cloud environment, historical performance data of the plurality of end-point computing devices, scheduled maintenance data of the plurality of end-point computing devices, or dynamic performance data of the plurality of end-point computing devices. Further, in some embodiments, the hybrid cloud may include a private cloud that comprises a legacy data center infrastructure.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 5:
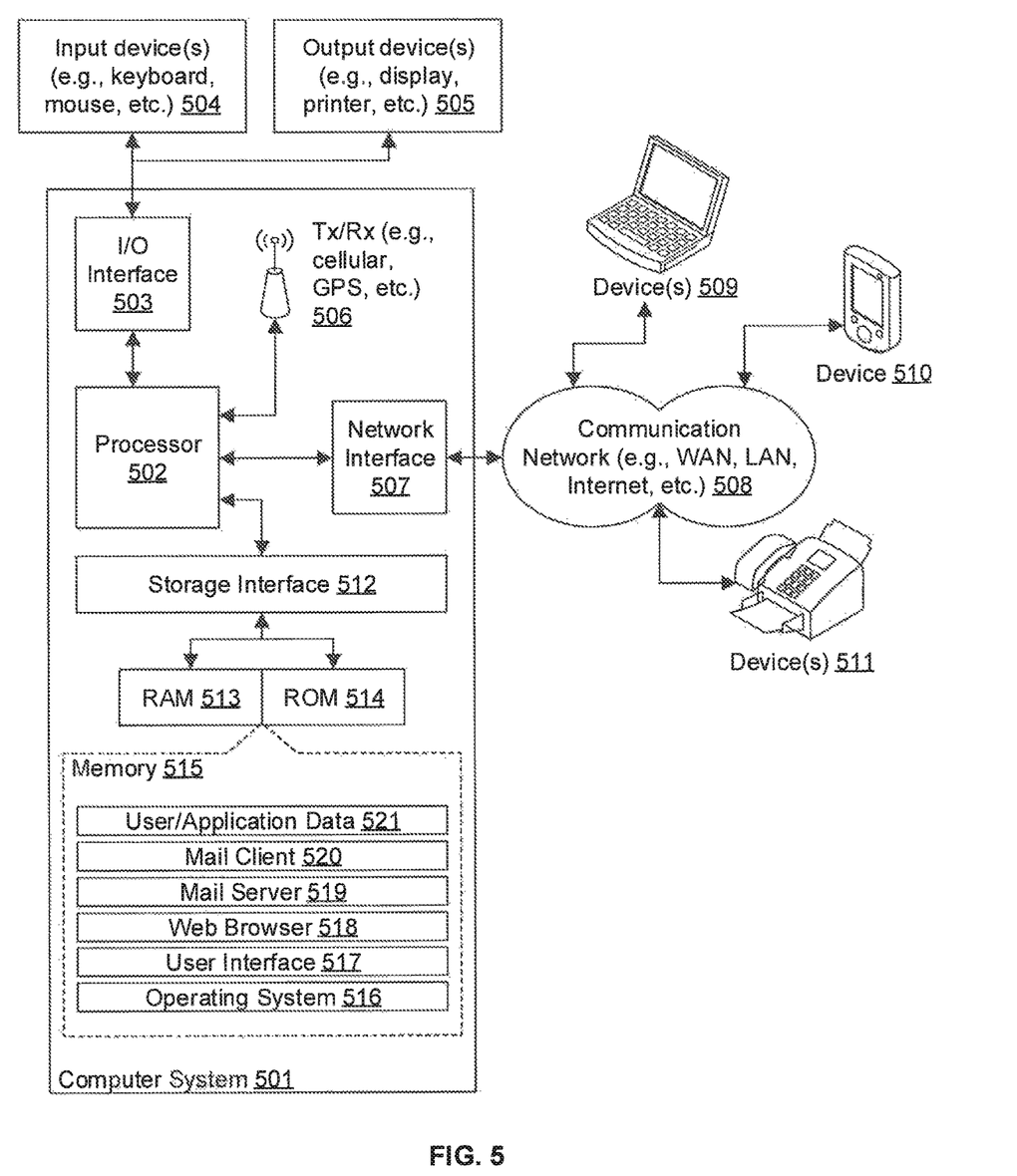
FIG. 5 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 501 for implementing embodiments consistent with the present disclosure is illustrated. Variations of computer system 501 may be used for implementing system 100 for performing intelligent orchestration within a hybrid cloud environment. Computer system 501 may include a central processing unit ("CPU" or "processor") 502. Processor 502 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE®-1394, near field communication (NFC®), FireWire, Camera Link®, GigE, serial bus, universal serial bus (USB®), infrared, PS/2, BNC, coaxial, component, composite, digital visual interface (DVI), high-definition multimedia interface (HDMI®), RF antennas, S-Video, video graphics array (VGA), IEEE® 802.n/b/g/n/x, Bluetooth, cellular (e.g., code-division multiple access (CDMA), high-speed packet access (HSPA+), global system for mobile communications (GSM), long-term evolution (LTE™), WiMax®, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE® 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS®, Google Android®, Blackberry OS®, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java®, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C #, Microsoft.NET®, CGI scripts, Java, JavaScript, PERL, PHP, Python®, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. (e.g., capacity or availability of each of the end-point computing devices, requested orchestration workflows, ability to successfully execute requested orchestration workflows along with their confidence scores, historical execution data, service level agreement (SLA), machine learning model, query data, historical troubleshooting data, historical network performance data, historical performance data of end-point computing devices, scheduled maintenance data of end-point computing devices, dynamic performance data of end-point computing devices, feedbacks to the users, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as objectoriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for performing intelligent orchestration. In particular, the techniques provide for providing artificial intelligence (AI) capability for performing orchestration in traditional data-center environments so as to overcome the shortcomings of the existing techniques. Further, the techniques described in the embodiments discussed above may improve the probability of successful execution of orchestration workflows. Further, the techniques provide for proactively informing the user/operator about chances of successful execution of orchestration workflow, and provide the realistic time required for completing the execution of the workflows even before the initiation of the execution of the workflows. As a result, the techniques ensure higher rates of successful execution of orchestration workflows, thereby saving time of the users by avoiding the need for re-executing the orchestration workflows, saving time of the administrators and operators by avoiding the need to troubleshoot repeated issues affecting the successful execution of the orchestration workflows, and avoiding blocking of precious system resources during orchestration workflow failures.

The specification has described method and system for performing intelligent orchestration within a hybrid cloud environment. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of performing intelligent orchestration within a hybrid cloud environment comprising a plurality of end-point computing devices, the method comprising:
   monitoring, by an orchestration device, a capacity and an availability of each of the plurality of end-point computing devices;
   predicting, by the orchestration device, an ability to successfully execute a requested orchestration workflow along with a confidence score, based on the capacity and the availability, by querying an intelligent database that comprises historical execution data of past orchestration workflows, wherein the confidence score is representative of a possibility of completing the requested orchestration workflow, if executed;
   effecting, by the orchestration device, an execution of the requested orchestration workflow based on the ability and the confidence score;
   building a machine learning model to analyze the intelligent database, and to respond to a query by the orchestration device; and
   providing a feedback to a user based on the ability and the confidence score, wherein the feedback comprises a notification of a probable failure in execution of the requested workflow or in execution of the requested workflow as per a service level agreement.

2. The method of claim 1, wherein predicting comprises predicting the ability to successfully execute the requested orchestration workflow as per a service level agreement.

3. The method of claim 1, wherein the intelligent database further comprises at least one of historical troubleshooting data to resolve failure of past orchestration workflows, historical network performance data of the hybrid cloud environment, historical performance data of the plurality of end-point computing devices, scheduled maintenance data of the plurality of end-point computing devices, or dynamic performance data of the plurality of end-point computing devices.

4. The method of claim 1, further comprising storing data with respect to the execution of the requested orchestration workflow in the intelligent database.

5. The method of claim 1, wherein the hybrid cloud comprises a private cloud that comprises a data center infrastructure.

6. A system for performing intelligent orchestration within a hybrid cloud environment comprising a plurality of end-point computing devices, the system comprising:
   an orchestration device comprising at least one processor and a computer-readable medium storing instructions that, when executed by the at least one processor, cause the at least one processor to perform operations comprising:
   monitoring a capacity and an availability of each of the plurality of end-point computing devices;
   predicting an ability to successfully execute a requested orchestration workflow along with a confidence score, based on the capacity and the availability, by querying an intelligent database that comprises historical execution data of past orchestration workflows, wherein the confidence score is representative of a possibility of completing the requested orchestration workflow, if executed;
   effecting an execution of the requested orchestration workflow based on the ability and the confidence score;
   building a machine learning model to analyze the intelligent database, and to respond to a query by the orchestration device; and providing a feedback to a user based on the ability and the confidence score, wherein the feedback comprises a notification of a probable failure in execution of the requested workflow or in execution of the requested workflow as per a service level agreement.

7. The system of claim 6, wherein the intelligent database further comprises at least one of historical troubleshooting data to resolve failure of past orchestration workflows, historical network performance data of the hybrid cloud environment, historical performance data of the plurality of end-point computing devices, scheduled maintenance data of the plurality of end-point computing devices, or dynamic performance data of the plurality of end-point computing devices.

8. The system of claim 6, wherein the operations further comprise storing data with respect to the execution of the requested orchestration workflow in the intelligent database.

9. A non-transitory computer-readable medium storing computer-executable instructions for:
monitoring a capacity and an availability of each of a plurality of end-point computing devices within a hybrid cloud environment;
predicting an ability to successfully execute a requested orchestration workflow along with a confidence score, based on the capacity and the availability, by querying an intelligent database that comprises historical execution data of past orchestration workflows, wherein the confidence score is representative of a possibility of completing the requested orchestration workflow, if executed;
effecting an execution of the requested orchestration workflow based on the ability and the confidence score;
building a machine learning model to analyze the intelligent database, and to respond to a query by the orchestration device; and
providing a feedback to a user based on the ability and the confidence score, wherein the feedback comprises a notification of a probable failure in execution of the requested workflow or in execution of the requested workflow as per a service level agreement.

10. The non-transitory computer-readable medium of claim 9, wherein the intelligent database further comprises at least one of historical troubleshooting data to resolve failure of past orchestration workflows, historical network performance data of the hybrid cloud environment, historical performance data of the plurality of end-point computing devices, scheduled maintenance data of the plurality of end-point computing devices, or dynamic performance data of the plurality of end-point computing devices.

11. The non-transitory computer-readable medium of claim 9, further storing computer-executable instructions for storing data with respect to the execution of the requested orchestration workflow in the intelligent database.

* * * * *